(12) United States Patent
Richards

(10) Patent No.: US 8,584,459 B2
(45) Date of Patent: Nov. 19, 2013

(54) ENGINE INDUCTION SYSTEM

(75) Inventor: Bryn Richards, Kenilworth (GB)

(73) Assignee: Aeristech Limited, Birmingham, West Midlands (GB)

(*) Notice: Subject to any disclaimer, the term of this patent is extended or adjusted under 35 U.S.C. 154(b) by 485 days.

(21) Appl. No.: 12/518,350

(22) PCT Filed: Nov. 14, 2007

(86) PCT No.: PCT/GB2007/004339
§ 371 (c)(1),
(2), (4) Date: Jun. 9, 2009

(87) PCT Pub. No.: WO2008/068453
PCT Pub. Date: Jun. 12, 2008

(65) Prior Publication Data
US 2010/0018203 A1  Jan. 28, 2010

(30) Foreign Application Priority Data
Dec. 9, 2006 (GB) .................. 0624599.7

(51) Int. Cl.
| F02B 33/44 | (2006.01) |
| F01D 15/10 | (2006.01) |
| F04B 23/00 | (2006.01) |
| H02K 7/14  | (2006.01) |
| H02P 1/04  | (2006.01) |
| H02P 27/04 | (2006.01) |

(52) U.S. Cl.
USPC .............. 60/608; 290/52; 417/243; 318/8; 318/430; 318/802

(58) Field of Classification Search
USPC ............ 60/607–609; 290/31, 52, 40 C; 417/243–244; 361/20; 318/430, 802, 318/141, 8
See application file for complete search history.

(56) References Cited

U.S. PATENT DOCUMENTS 2,159,758 A * 5/1939 Diedrich .................. 60/606
2,457,594 A * 12/1948 Nettel et al. ............. 60/784
(Continued)

FOREIGN PATENT DOCUMENTS

| CA | 2326849 A1 | 10/2000 |
| CH | 653411 A5 | 5/1981 |

(Continued)

OTHER PUBLICATIONS

European Patent Office Search Report for 07824564.4 dated Feb. 3, 2011.

(Continued)

*Primary Examiner* — Thai Ba Trieu
(74) *Attorney, Agent, or Firm* — Andrus, Sceales, Starke & Sawall, LLP

(57) ABSTRACT

A forced induction system for an engine comprising a compressor for increasing the pressure of gas into the engine and a turbine arranged to be driven by engine exhaust gas. The system further comprises a generator and an electric motor. The generator is arranged to be driven by the turbine and the motor is arranged to drive the compressor, wherein the generator and motor are electrically connected. The system comprises electrical control means arranged to receive the electrical signal output by said generator during operation and to apply an AC control signal to said electric motor whereby the compressor is driven at least in part by an output torque of the turbine via the electrical connection therebetween.

19 Claims, 6 Drawing Sheets

(56) References Cited

U.S. PATENT DOCUMENTS

| | | | |
|---|---|---|---|
| 2,994,787 A * | 8/1961 | Fraser | 318/8 |
| 3,591,844 A * | 7/1971 | Schonebeck et al. | 290/52 |
| 3,948,053 A | 4/1976 | Gamell | |
| 4,038,558 A | 7/1977 | Gallois | |
| 4,125,345 A * | 11/1978 | Yoshinaga et al. | 417/243 |
| 4,394,582 A | 7/1983 | Kreissl et al. | |
| 4,425,766 A * | 1/1984 | Claypole | 123/41.12 |
| 4,694,653 A | 9/1987 | Kawamura | |
| 4,719,756 A | 1/1988 | Streuli | |
| 4,756,377 A | 7/1988 | Kawamura et al. | |
| 4,774,811 A | 10/1988 | Kawamura | |
| 4,833,887 A | 5/1989 | Kawamura et al. | |
| 4,864,151 A | 9/1989 | Wyczalek et al. | |
| 4,901,530 A * | 2/1990 | Kawamura | 60/608 |
| 5,005,539 A * | 4/1991 | Kawamura | 123/21 |
| 5,022,353 A * | 6/1991 | Kamamura | 60/607 |
| 5,133,298 A | 7/1992 | Ahnger | |
| 5,313,797 A | 5/1994 | Bidwell | |
| 5,323,613 A * | 6/1994 | Akiyama | 60/608 |
| 5,450,007 A * | 9/1995 | Payne et al. | 324/141 |
| 5,528,444 A * | 6/1996 | Cooke et al. | 361/20 |
| 5,528,445 A * | 6/1996 | Cooke et al. | 361/20 |
| 6,089,020 A | 7/2000 | Kawamura | |
| 6,125,631 A | 10/2000 | Hagglund | |
| 6,145,314 A | 11/2000 | Woollenweber et al. | |
| 6,282,897 B1 * | 9/2001 | Paul | 60/598 |
| 6,418,707 B1 * | 7/2002 | Paul | 60/784 |
| 6,487,096 B1 | 11/2002 | Gilbreth et al. | |
| 6,647,724 B1 | 11/2003 | Arnold et al. | |
| 6,655,325 B1 | 12/2003 | Botti et al. | |
| 6,735,945 B1 | 5/2004 | Hall et al. | |
| 7,398,650 B2 * | 7/2008 | Bottcher et al. | 60/624 |
| 7,958,727 B2 * | 6/2011 | Arnold | 60/605.1 |
| 2001/0037642 A1 * | 11/2001 | Uchida | 60/277 |
| 2002/0148227 A1 | 10/2002 | Mackay | |
| 2004/0216458 A1 | 11/2004 | Spooner | |
| 2005/0001582 A1 * | 1/2005 | Goto et al. | 318/802 |
| 2005/0050887 A1 | 3/2005 | Frank et al. | |
| 2006/0032225 A1 | 2/2006 | Dyne et al. | |
| 2006/0113799 A1 | 6/2006 | Obayashi et al. | |
| 2007/0151241 A1 | 7/2007 | Arnold | |
| 2008/0289333 A1 | 11/2008 | Godeke et al. | |
| 2009/0019852 A1 * | 1/2009 | Inoue et al. | 60/608 |
| 2010/0270961 A1 * | 10/2010 | Schanzenbach et al. | 318/430 |

FOREIGN PATENT DOCUMENTS

| | | |
|---|---|---|
| DE | 202006010245 | 12/2007 |
| EP | 0344902 B1 | 6/1992 |
| EP | 0397316 B1 | 7/1993 |
| EP | 0715058 A1 | 6/1996 |
| EP | 1801388 A2 | 6/2009 |
| FR | 2483517 | 5/1981 |
| FR | 2592916 | 1/1986 |
| GB | 1116082 | 9/1965 |
| GB | 2283064 A | 10/1993 |
| JP | 55025590 A | 2/1980 |
| JP | 59020526 A | 2/1984 |
| JP | 62093430 A | 4/1987 |
| JP | 1-262324 A | 10/1989 |
| JP | 3160822 A | 7/1991 |
| JP | 5-141254 A | 6/1993 |
| JP | 6002553 A | 1/1994 |
| JP | 2005256651 A | 9/2005 |
| JP | 2007239566 A | 9/2007 |
| JP | 2007263026 A | 10/2007 |
| JP | 2008284797 A | 11/2008 |
| JP | 2008286016 A | 11/2008 |
| WO | 9428298 | 12/1994 |
| WO | 9845589 | 10/1998 |
| WO | 2004011790 A1 | 2/2004 |
| WO | 2004031590 A1 | 4/2004 |
| WO | 2005113960 A1 | 12/2005 |
| WO | 2007078586 A1 | 6/2007 |
| WO | 2007148369 A1 | 12/2007 |

OTHER PUBLICATIONS

Zhao et al., "A DSP-Based Super High-Speped PMSM Controller Development and Optimization", IEEE, 11th Digital Signal Processing Workshop & IEEE Signal Processing Education Workshop, 2004, p. 187-190.

English translation of JP 5-141254. published on Jun. 8, 1993.

English translation of JP 1-262324 published on Oct. 19, 1989.

EP Search Report dated Aug. 14, 2012.

* cited by examiner

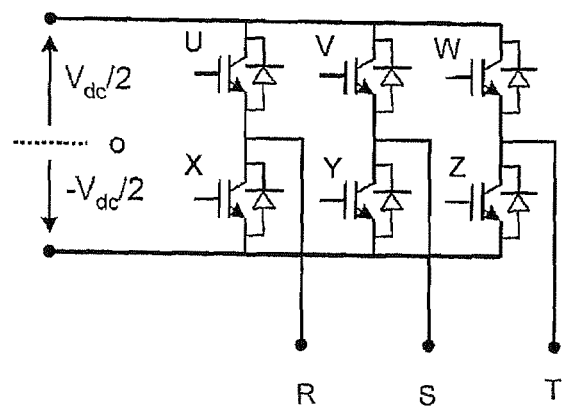
Fig. 6A
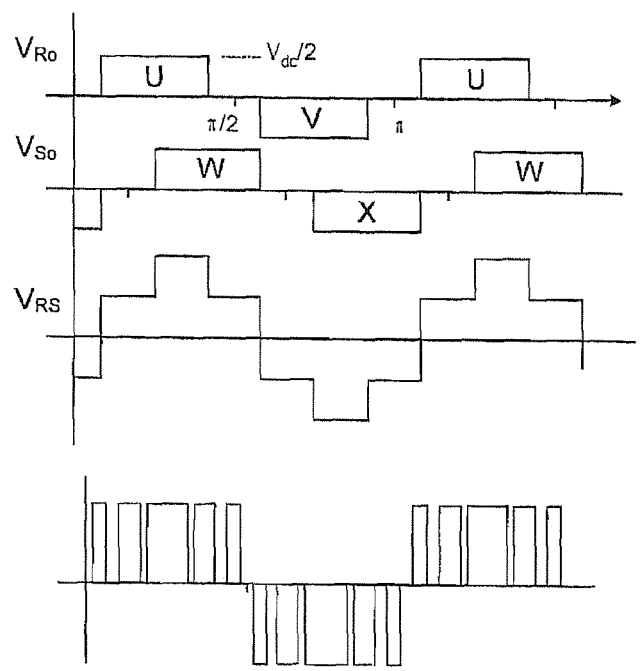
Fig. 6B
Fig. 6C
Fig. 6

ENGINE INDUCTION SYSTEM

CROSS-REFERENCE TO RELATED APPLICATIONS

This application is the U.S. national stage application of International Application PCT/GB2007/004339 filed Nov. 14, 2007, which international application was published on Jun. 12, 2008, as International Publication WO 2008/068453 in the English language. The International Application claims priority of GB Patent Application 0624599.7, filed Dec. 9, 2006.

BACKGROUND OF THE INVENTION

The present invention relates to forced air induction systems for engines and more particularly, although not exclusively, to the use of such systems for improving the performance of an internal combustion engine.

Turbochargers and mechanical superchargers are well known forms of forced air induction systems. Both systems operate by driving a compressor so as to increase the air pressure into an internal combustion engine in order to improve performance. The source of the driving force for the compressor has a significant impact on the overall performance of the engine. A turbocharger derives the energy to power the compressor from exhaust gasses from the engine via a turbine, whereas a supercharger compressor is driven directly or indirectly by the engine crankshaft.

Thus the aim of a turbocharger differs significantly from that of a supercharger. In essence, a turbocharger aims to recover energy, at least some of which would otherwise be lost, thus improving engine efficiency. A supercharger sacrifices engine efficiency by drawing power from the crankshaft in order to improve responsiveness.

The different sources of power used to drive the compressor affects the practical operation of different charge air systems.

In use, a turbocharger is required to operate in continually transient conditions over a wide range of operational speeds. However turbine design is not flexible enough to allow suitable operation of the turbocharger over the entire spectrum of engine speeds and so operation at low engine speeds is typically sacrificed in favour of improved operation of the turbocharger at greater speeds.

A further problem associated with conventional turbochargers is the boost threshold. In order to operate the compressor, it is necessary for the exhaust gas flow from the engine to be sufficient to drive the turbine at suitable rotational speeds. At low engine speeds, the exhaust gas flow may be insufficient to attain the required turbine flow rate and thus a conventional turbocharger is often unable to meet acceleration demands placed on the system until a threshold engine speed has been reached. This need for a sufficient engine exhaust pressure to operate the turbocharger results in the turbocharger being idle or ineffective at low speeds.

Given the inherent difficulties in designing a system for transient use, a turbocharger tends to be designed around 'average' operational conditions. Therefore turbochargers conventionally achieve optimal performance when operating in substantially steady state conditions which require a constant supply of exhaust gas. Furthermore the turbocharger inertia also causes a delay in response to variations in engine output, often referred to as turbo lag, which compromises the driveability of a turbocharged vehicle. Turbo lag may also be attributed to insufficient exhaust gas being available at the instant an acceleration demand is made by the driver.

Once the turbocharger is operational, the turbine inertia also causes the turbocharger to recover energy which is potentially unwanted by the driver upon a deceleration of the vehicle. For this reason, a wastegate is often required to effectively bypass the turbine. This results in complex systems which are prone to reliability issues and for which operational efficiency is reduced.

The connection of the supercharger compressor to the engine crankshaft results in operation of the compressor in tune with the demands made of the engine by the driver. A supercharger responds almost instantaneously to driver inputs, improving driveability even at low engine speeds, albeit at the detriment to engine efficiency.

The above problems have been well documented and a number of solutions proposed in order to supplement the operation of turbo and superchargers. US2004216458 discloses the use of an electric motor assisted turbocharger, in which the turbocharger is power assisted, particularly at low engine speeds, in order to improve responsiveness. Whilst such an arrangement, does improve driveability to some extent, it does not adequately address the problem of the turbocharger generating unwanted energy during deceleration. Thus, as is common with turbochargers, a wastegate must be provided to allow exhaust gas to bypass the turbocharger when necessary, causing potentially useful exhaust pressure to be lost. In addition, the electric motor must be synchronised with the rotation of the turbine/compressor shaft in order to be effective.

US2006032225 discloses the combined use of a supercharger and a turbocharger in conjunction with a hydraulic pump, which acts to drive the turbocharger up to an operational speed and then hold back the turbocharger to keep it at the right speed for the engine conditions. The holding back of the turbocharger to suit engine conditions results in the turbocharger efficiency being dictated by the requirements placed upon the compressor by the driver, ultimately capping the available efficiency savings.

In view of the foregoing problems, it is an object of the present invention to provide a more efficient and flexible forced induction system for an engine.

SUMMARY OF THE INVENTION

According to the present invention, there is provided a forced induction system for an engine, the system comprising: a compressor for increasing the pressure of gas into the engine; a turbine arranged to be driven by engine exhaust gas; a generator arranged to be driven by the turbine; and, an electric motor arranged to drive the compressor, wherein the generator and motor are electrically connected such that the compressor is driven at least in part by an output torque of the turbine via said electrical connection.

The present invention is particularly advantageous since the compressor need not be connected to the turbine by a shaft or other mechanical linkage. Thus the rotation of the compressor need not be dictated by the instantaneous rotation of the turbine.

The decoupling of the turbine and compressor has the advantage that the compressor can be controlled to operate in response to driver requirements so as to improve responsiveness independently of operational limitations of the turbine, such as turbine inertia. Conversely, the turbine is responsive to the flow of exhaust gas rather than the requirements of the compressor and can be aerodynamically optimized.

According to a preferred embodiment, the electrical connection comprises energy storage means. Thus energy generated by the turbine need not be transmitted instantaneously to the compressor but can instead be stored for later use as and when required by the demands made of the engine by the driver. The rotational speed of the turbine need not be checked in line with immediate engine requirements but can instead operate at maximum efficiency.

Electrical energy may be stored by way of a capacitor or battery even when the engine is switched off. This provides a ready source of energy to compensate for the operational delay of the turbine and supplement power to the compressor at low engine speeds or whilst the engine is warming up.

Furthermore the decoupling of the turbine and compressor allows the design of the turbine and compressor geometries to be optimised independently. Turbine may spin faster or slower than compressor subject to further study and perhaps dependent on specific vehicle tuning requirements. The turbine will have a geometry and a typical operating speed as required to optimise exhaust energy capture. The compressor will be independently designed to meet the performance requirements specified by the vehicle design. Accordingly the invention allows independence between turbine and compressor speeds.

When a greater engine output is required, according to the present invention, the compressor wheel can be driven in isolation of the turbine wheel. This improves performance compared to a conventional turbocharger arrangement, in which the exhaust gas is required to drive both the turbine and compressor simultaneously in order to increase air compression into the engine.

Preferably the system comprises electrical control means for controlling the flow of power from the generator to the motor and/or storage means. Typically the control means comprises one or more switches for selective control of the flow of current between the storage means and the motor. In this regard, the turbine may be slightly larger than in an equivalent conventional turbocharger to reduce the operating speeds and thus reduce or avoid the use of a wastegate. Normally, lower speeds would compromise the effectiveness of the compressor but decoupling allows the compressor to operate at higher speeds than the turbine. Thus, decoupling can improve the average efficiency of each of the turbine and compressor over the range of engine operation, partially or fully compensating for inefficiencies in the electrical system connecting them.

The use of an alternating current (AC) signal to control the rotational frequency of the compressor is particularly advantageous since it allows a fully electric compressor drive to be provided. Furthermore the rotation of the compressor can be controlled by adapting the AC signal using relatively small and lightweight electrical equipment instead of complex and costly mechanical components. The frequency of the generator AC output can advantageously be used to control the speed of mechanical output in place of a conventional shaft. Thus the speeds of the turbine and compressor can be synchronized when required.

A high frequency AC generator may be used to drive a high-frequency AC motor. In one embodiment the control means comprises frequency modulation means in the form of an inverter. Typically the frequency modulation means is connected between the generator, the energy storage means and the motor. Thus the frequency of the signal controlling the rotation of the compressor can be altered in line with a control philosophy and engine requirements without the requirement for complex variable mechanical gearing.

Preferably the control means comprises a processor which, according to a preferred embodiment, can interface with a conventional vehicle controller. In one embodiment, the control means allows selection of a control mode from a plurality of predetermined modes. These may include a general mode, a sport mode, or the like. Accordingly the present invention can be used to provide a user with increased customization options to suit personal preferences such as variable engine braking, torque response, or synchronization with driver attributes such as gear change characteristics.

Typically the control means generates AC waveforms for driving a high-speed AC electric machine at high voltage. The control of the AC frequency may advantageously be independent of the AC amplitude which allows improved mechanical operation of the motor. Thus the output pressure and the mass flow rate of the compressor can be controlled with at least some degree of independence in transient conditions.

In contrast to the relatively small, lightweight high speed electric machines used with the present invention, conventional electrically-driven compressors are typically fixed displacement devices, which use low speed DC drive systems and which are heavy, mechanically complex and unable to remain operating whilst a vehicle is running at relatively high flow rates. The smaller, high speed machines which can be implemented by way of the present invention also have less inertia.

Additionally, or else alternatively, mechanical gearing can be provided between the turbine and generator and/or between the motor and compressor. Such gearing may be provided simply to account for the different ranges of operational speeds of the generator and turbine or else the motor and compressor. Thus the rotational output of the turbine can be stepped down for suitable operational speeds of the generator and conversely the motor output can be stepped up to suitable compressor speeds.

Preferably the electrical connection comprises a DC bus connected to the energy storage means, the generator and the motor. A single phase or else a three-phase motor and generator may be provided. A single phase system is in many ways preferred for the simplicity and can be provided with rotational control means to ensure the motor spins in the correct direction. A rectifier may be used to convert AC output of the motor into a DC input to the storage device.

According to a preferred embodiment, the system comprises a first generator driven by the turbine and a second generator driven by the engine crankshaft.

Typically, the first and second generators are connected to controller means, which selectively control the supply of energy to the storage means and/or the motor depending upon the requirements of the engine.

The output torque of the engine crank shaft can thus be used to power the compressor motor via a second electrical generator.

Whilst the provision of such an arrangement can compromise efficiency akin to a conventional supercharger, the control of the operation of the combined turbocharger and supercharger by way of the electrical connection therebetween allows the turbocharger and the supercharger components to be used in a more effective manner, which has not been hitherto possible. Thus, whilst some efficiency is sacrificed by use of the second generator, the increased responsiveness and driveability ultimately allows a smaller engine to be substituted for a larger conventional naturally aspirated engine, whilst maintaining the required level of performance according to a control strategy. In this manner, emissions and efficiency savings can be achieved without sacrificing driveability.

The driveability and responsiveness of an engine provided with a system according to the present invention may also be greatly improved compared to a conventional turbo-charger arrangement.

The slight loss in steady state efficiency due to the need to operate the electrical transmission system, can be counteracted by the increase in energy which can be recovered by the turbine in varying states. When it is considered that an engine rarely operates in steady state conditions, the present invention can provide an increase in efficiency over conventional turbocharging and supercharging arrangements, in which mechanical linkages are provided between the turbine and compressor.

In one embodiment, the transmission means is connected to a conventional vehicle battery. Thus, a conventional DC battery can supplement the power to the compressor during start-up. The storage device may replace the conventional battery or vice versa and in one embodiment, the conventional battery connection may replace the use of the engine crankshaft to provide power to the compressor when the output of the turbine is insufficient.

According to one particular embodiment, the system comprises an energy wasting device such as a resistor or the like to remove unwanted energy from the system.

BRIEF DESCRIPTION OF THE DRAWINGS

Preferred embodiments of the present invention are described in further detail below, with reference to the accompanying drawings, of which.

DETAIL DESCRIPTION OF THE PREFERRED EMBODIMENT

Figure 1:
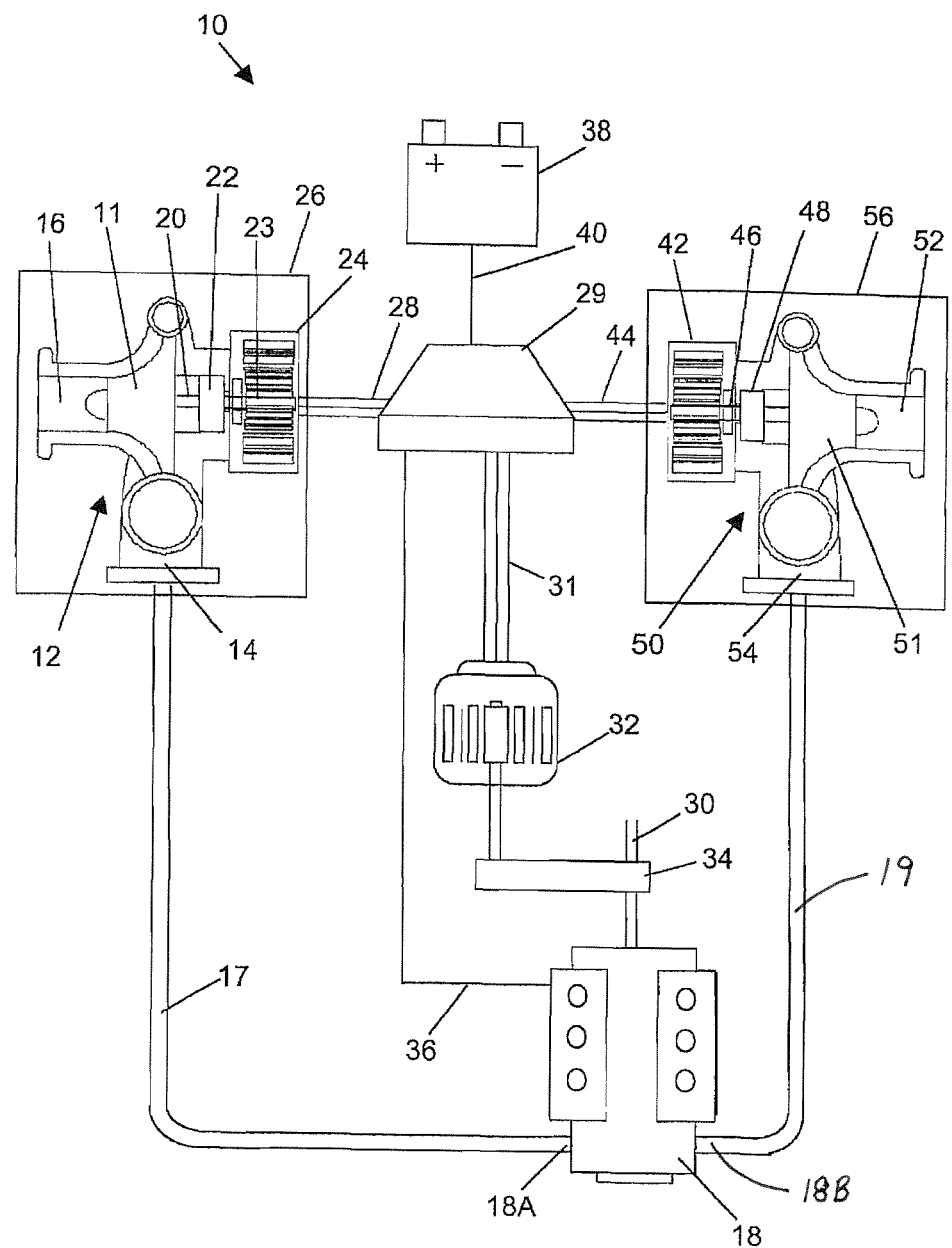
FIG. 1 is a schematic of the basic components according to one embodiment of a system according to the present invention.

Turning firstly to FIG. 1, there is shown the physical connections between the basic components according to one embodiment of the present invention. It will be appreciated that the system of the present invention is typically suited for use in conjunction with internal combustion engines for road vehicles, although the present invention can be applied to other applications in which there is a transfer of compression work between two gas streams.

The basic system 10 shown in FIG. 1 comprises a turbine 12 having a turbine wheel 11, a tangential gas inlet 14 and an axial gas outlet 16. The inlet 14 is connected to the exhaust 18A of engine 18 by ducting 17 in a conventional manner, such that the flow of combustion gasses exiting the engine cylinders drives the turbine 12.

A variable frequency AC generator 24 is connected to the turbine output shaft 20. The output torque of the turbine drives the three-phase generator rotor. Mechanical linkage in the form of gearing 22 is provided between the turbine output shaft 20 and the generator rotor 23, such that the angular velocity of the rotor is less than that of the output shaft 20. The gearing 22 may not be required in other embodiments and may be replaced or supplemented by a clutch mechanism to allow the turbine to be decoupled from the generator in the event that the angular velocity of the turbine is too great.

The generator 24, the gearing 22 and the turbine 12 are contained within a unitary or common housing 26 for ease of assembly, although it will be appreciated that the components can be provided as individual parts as required. Typically the axis of rotation of the generator is parallel with or coaxial with the axis of rotation of the turbine. A three-phase electrical connection 28 is provided between the generator 24 and interface 29, which takes the form of direct current (DC) bus and associated control means, comprising a frequency modulating controller. The DC bus has a further three-phase AC electric input connection 31 from the engine 18. In this regard, the engine crankshaft 30 is selectively connected to a further variable frequency AC generator 32 by belt 34. A clutch (not shown) or other conventional means may be interposed between the crankshaft and the generator rotor, so that the generator 32 can be selectively connected and disconnected from the crankshaft under control of the control means.

A DC line 36 connects interface 29 to conventional engine DC circuitry. It will be understood that an engine typically comprises an alternator for powering a vehicle's electronic components, the engine ignition and also for charging the vehicle battery. The conventional engine battery therefore provides an additional power source for use as described in relation to FIG. 2 below.

The interface 29 has outputs to a storage device such as a battery 38 by a DC connector 40; conventional battery (not shown) via DC connector 36; and, motor 42 via three-phase AC electric connection 44.

Connector 44 connects interface 29 to the motor stator, which drives a rotor having output shaft 46. The rotor output is connected to compressor 50 by gearing 48. The compressor 50 has a compressor wheel 51, and axial gas inlet 52, which is open to ambient air, and a tangential gas outlet 54, which is connected to the engine air inlet 18B by ducting 19. The generator 42, gearing 48 and compressor 50 are provided in a unitary housing 56. Typically the axis of rotation of the motor is parallel with or coaxial with the axis of rotation of the compressor.

Figure 2:
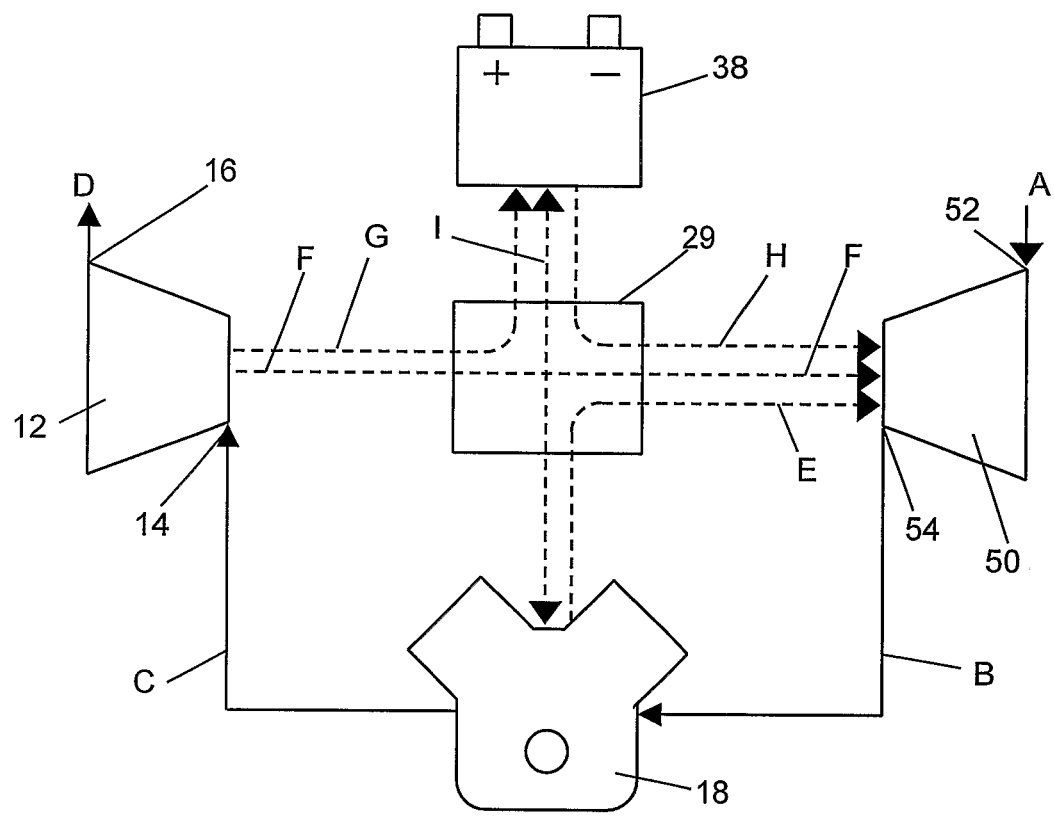
FIG. 2 is a schematic of the energy flow around the system of FIG. 1.

Turning now to FIG. 2, a simplified operation of the system is described below, with reference to the flow of energy between the components shown in FIG. 1.

Firstly, with reference to the flow of gasses through the system, air is drawn into the compressor inlet 52 from ambient at A by virtue of a pressure gradient caused by rotation of the compressor. Work is done on the air by way of a compressor wheel within compressor 50, resulting in a flow of compressed air along a conduit 19 linking the compressor outlet to the engine inlet 18B in the direction of arrow B. The exhaust gasses are ducted from the engine 18 to turbine inlet 14 along conduit 17 in the direction of arrow C. Work is done by the exhaust gasses on the turbine wheel in order to generate a turbine output torque, whereby the exhaust gasses exit the turbine 12 at outlet 16 at reduced pressure in the direction of arrow D.

The flow of electrical energy between the components will now be described in relation to the flow paths E to I. The interface 29 comprises a number of switches, such that control means can select between the flow paths E to I in accordance with various operating parameters and a pre-defined set of instructions. In this regard, it will be appreciated that a number of sensors are provided throughout the system in order to measure a number of operational variables and to regulate the flow of electricity, as required. The sensors sense engine throttle, the use of the vehicle brakes, engine speed, ambient air temperature, engine oil temperature, turbine speed, compressor speed and the charge of the storage means, amongst other variables.

The sensor readings are fed to the control means which comprises a processor and the system control is implemented using algorithms and control logic, which prioritises the demands placed upon the engine by a driver, followed by the maintenance of optimum operational efficiency. In essence this results in a hierarchy of power sources for the compressor, such that the control means seeks to draw power for the compressor primarily from the turbine generator 24. If the instantaneous power from the turbine 24 is insufficient, then power is sought from the storage means 38. Finally, if the storage means 38 is insufficiently charged to power the compressor, power is drawn from line 36 or else the engine crankshaft 30 via the generator 32. However in a simplified embodiment, the line 36 and/or the electrical connection with the crankshaft generator 32 may be omitted such that the system can operate based upon power derived from the turbine 12 only.

The processor typically comprises a dedicated CPU, which is programmed to control the operation of the system in accordance with the received sensor readings and a control philosophy. Communication between the dedicated CPU and the standard vehicle operating system is possible by way of a low level serial interface component. However it will be appreciated that the system may be controlled by the engine CPU.

A number of operating modes for the system are described below.

During start-up, that is before the turbine 12 is generating sufficient torque to power the compressor 50, the compressor draws power from the engine crankshaft via flow path E. Thus, the engine generator 32 generates AC power which is fed to the compressor. The interface 28 comprises frequency modulation means, such that the frequency of the electrical signal output by the engine generator 32 is increased or decreased in line with the requirements of the compressor.

In addition, if a sufficient charge is stored by the battery 38 at start-up, then the compressor can be powered by the battery during start-up in stead of via the engine crankshaft. For two-stroke engines which require compressed air upon start-up, this can provide a significant advantage and can also reduce emissions. This emissions benefit also pertains to four-stroke engines but typically to a lesser extent. The system is also particularly suited to applications where frequent and rapid start-up of an IC engine is required such as for example within hybrid vehicles.

In a boost threshold mode, the system is operating under relatively low speed and light loads, typically between idle and 1,500 rpm. The exhaust gas energy is unlikely to be sufficient to drive the turbine and compressor in order to provide positive boost. Accordingly the system draws energy for the compressor from the engine generator 32 or else from the battery or supercapacitor 38. A conventional turbocharger would be unable to provide sufficient compressed air in such circumstances.

Once the exhaust gas pressure is sufficient to power the turbine at suitable rotational speeds, power from the turbine generator is delivered to the compressor motor along flow path F. This power will be sufficient to drive the compressor during steady state driving conditions and also during gentle acceleration. These conditions represent a substantially constant load mode of operation. The turbine and compressor and the associated gearings will typically be designed, such that signal frequency modulation is not required during steady state operation. The rotational speeds of the turbine generator and the compressor motor may be substantially the same and the rotational speed of the turbine may be proportional to that of the compressor.

When the control means senses that excess power is being generated by the turbine, any power which is not required instantaneously by the compressor is fed to the storage device 38. Rectification means is provided at the interface 29, such that the three-phase AC supply is converted to DC suitable for charging the battery, capacitor, super capacitor or the like along flow path G. Under these conditions, a charging mode of operation is established. This will typically occur during deceleration when the turbine 12 is generating unwanted power due to turbo lag. The generator 24 resists rotation of the turbine, thus preventing over-speed of the turbine and helping to slow the engine more quickly when the user applies the brakes. In addition, the flow of power from the turbine to the compressor along flow path F can be cut immediately, reducing the air inlet pressure into the engine 18, reducing power loss and emissions.

During rapid acceleration, the turbine alone may be insufficient to meet the requirements placed on the compressor by the engine and so the control means supplements the turbine power with energy from the battery 38 along flow path H. This may be referred to as a full load operational mode. An inverter is required to convert the DC output of the battery into AC at the frequency required by the compressor motor. The maximum power condition serves to illustrate a further benefit of the system. In a conventional turbocharger, the design of the turbine is compromised in order to improve the acceleration of the turbine with lower rates of air flow. This is detrimental to high-speed operation and results in intrusive use of a wastegate to limit turbine power. The present invention allows the optimisation of the turbine for effective power capture without compromise in respect of low air flow performance. This is because the compressor speed can be controlled at all times to provide the best achievable engine performance independently of the operation of the turbine.

Alternatively, if driving conditions have resulted in the battery 38 being insufficiently charged during steady state operation, then demands on the compressor during rapid acceleration can be met by supplementing the turbine power or energy derived from the crankshaft via flow path E.

An additional flow path I is provided between the battery 38 and the engine 18. Thus, the control means can deliver or draw power to/from the engines conventional DC electrical system via a standard or else an up-rated alternator. Dependent on the storage conditions, this may substitute for the engine generator 32. In addition, the link 36 along the flow path I allows more efficient transfer of small amounts of power to or from the turbo charger storage device and the vehicles conventional electric circuitry and battery.

In place of flow path E, power from the engine crankshaft and/or standard battery may be delivered to energy storage means 38 prior to powering compressor 50.

The improved control of the compressor offered by the present invention may also be of benefit for a variety of engine fuel types which are not well suited to direct fuel injection systems. A finely controlled source of compressed air may enable carburettor injection whilst potentially allowing precise control of cylinder fuel flow as in a port injection system. This simplified fuel handling may provide a substitute to port injection for a number of fuel types.

Whilst the above description discusses the use of three-phase AC power, the system could operate based upon generation of single phase AC power by providing a single phase AC motor at 24 and by replacing connections 28, 31 and 44 with simple single-phase lines. Fewer phases generally allow lower frequencies within the controller. However any number of multiple phases are possible and are not excluded.

FIGS. 3 to 6 relate to preferred embodiments of electrical components and control schemes. It is a notable design requirement of the electrical machines in the system that exceptionally high rotational speeds in the region of 120,000-150,000 rpm should be maintained over long periods of operation. Such rotational speeds are far beyond the capabilities of most electric motors and generators and have been practically unattainable at reasonable cost until recent developments in motor design and power electronics.

Figure 3:
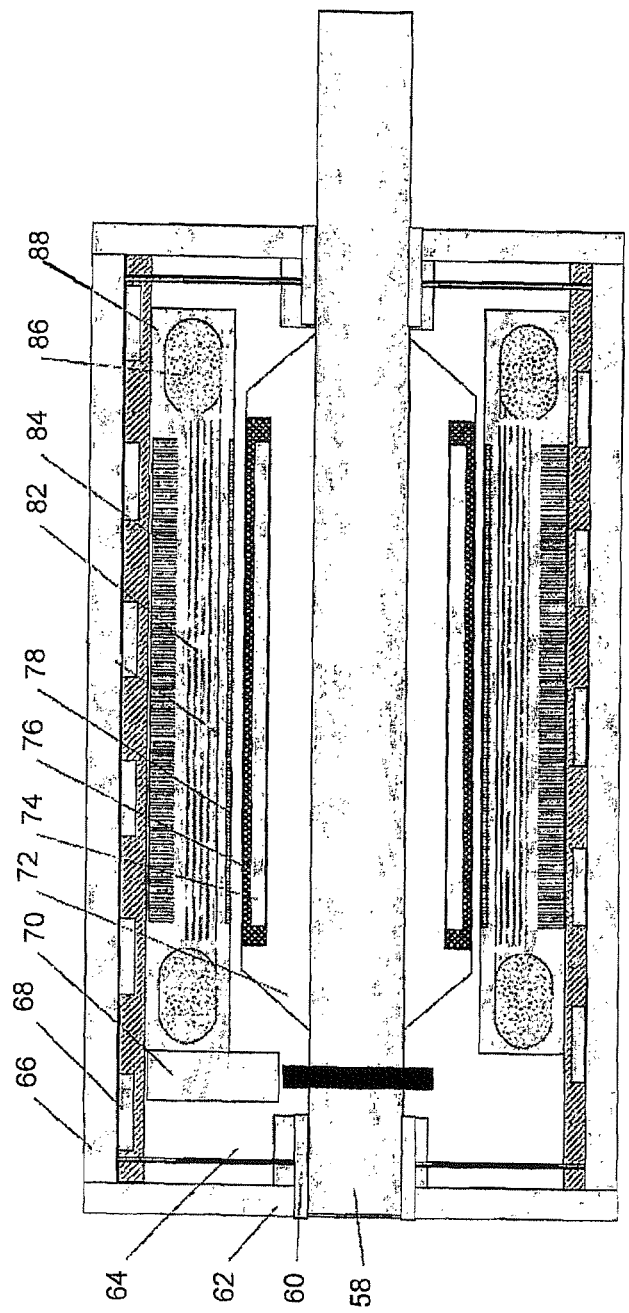
FIG. 3 shows a sectional view of an electrical machine in one embodiment of the present invention.

FIG. 3 illustrates a general arrangement of an electrical machine for use in conjunction with the present invention. It will be appreciated that the term 'electrical machine' is intended to cover both motors and generators. FIG. 3 shows a permanent magnet type machine which is in many ways preferred due to its efficiency, robust construction and avoidance of the need for an electrical connection to the rotor. Other alternative types of machine are possible such as cage-rotor induction machines, solid-rotor induction machines and switched-reluctance machines.

The motor and generator may have substantially the same torque profile or else it may be advantageous for the power output of the generator to be greater than the compressor motor in order to account for energy losses in the electrical machines within the system. Regardless of this option, the general construction of the motor and stator will typically be similar.

In FIG. 3, a permanent magnet brushless type machine is shown, and has a shaft 58, which may be equivalent to the rotor 23 or shaft 46 shown in FIG. 1, passing through the end wall or cap 62 of housing 66. A bearing 60 is provided at each end of the housing for supporting the shaft 58. The bearings 60 may comprise rolling elements or else may comprise free-floating hydrodynamic type bearings.

The shaft 58 is provided with a rotor body 72 which may be formed with the shaft 58, for example by a single forging, or else fitted thereto for example by keying or shrink-fitting. In this embodiment the rotor body 72 is solid. The rotor body is shaped to provide a circumferential channel in which the rotor magnet is positioned in a surface mounted arrangement. The magnet 74 comprises a series of radially-polarised permanent magnets which are held in place on the rotor body 72 by magnet retaining means in the form of a sleeve or banding 76 or adhesive. The magnet 74 may be held against the rotational force by a lightweight high strength composite such as carbon or glass fibre or else by a metal sleeve. A high strength sleeve-type retainer has been found to be beneficial since it offers assurance against failure at high speeds.

The shaft 58, rotor body 72 and magnets 74 comprise the rotor portion of the machine which is rotable within the stator housing 66 during use. The stator portion comprises a series of conductive stator coils 82 formed of wires located about the rotor magnet 74 and having coil ends 86. The wires and coil ends are held in a thermally conductive encapsulation material 88 such as for example a resin. The encapsulation material conducts heat away from the wires to an outer sleeve 68 which is provided with cooling channels. A water cooling arrangement may also be provided at 64.

The stator windings are located between a radially outer back iron 84 and a radially inner toothed liner 78 positioned between the windings and the rotor. The winding is a star-connected three-phase type.

In one embodiment, a shaft position sensor 70 may be mounted in the stator housing 66 to monitor the location of the shaft during use.

It we be appreciated that an axial-flux permanent magnet machine could be substituted for the radial flux permanent magnet machine shown in FIG. 3, although the topology of the system in practical terms generally favours the use of a radial flux design. The present invention allows relatively simple electrical machines to be used with the more complicated control functions being handled by way of the control means. In addition the high voltage system allows relatively small diameter wires to be used compared with low voltage (high current density) or DC (high transmission loss) applications.

Figure 4:
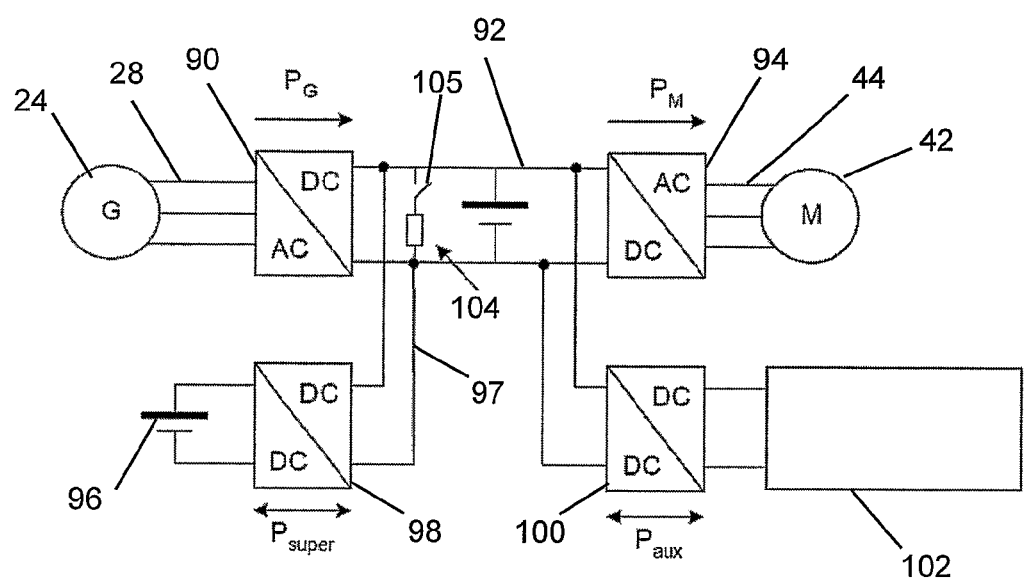
FIG. 4 shows a basic layout of an electrical system for power conversion in accordance with one embodiment of the present invention.

Turning now to FIG. 4, there is shown a basic power conversion system. As discussed above, the single or three-phase AC power signal or waveform from the generator 24 can be used to control the rotation of the motor 42 directly in one embodiment. However, in order to achieve the desired flexibility and energy efficiency the system will typically comprise one or more power converters. FIG. 4 is intended to represent one embodiment of a simplified power conditioning system which can be used according to the present invention.

In FIG. 4, the generator 24 is connected to an AC/DC converter or rectifier 90. A DC link 92 connects the converter 90 to a DC/AC converter or inverter 94 which supplies AC power to the motor 42. It is proposed that the DC link voltage may be between 350 and 600 Vdc.

Energy storage means in the form of a supercapacitor 96, which operates at for example 100-200 Vdc, is connected to the DC link 92 via line 97. A DC/DC converter 98 is connected between the supercapacitor 96 and the DC link 92. Similarly, if an auxiliary power supply 102 is used in the system, such as a further battery or capacitor which may be charged by power derived from the crankshaft, a further DC/DC converter 100 may also be connected to DC link 92. The auxiliary power supply may, for example, comprise a drive shaft mounted Integrated Starter Alternator Damper (ISAD) connected to the vehicle low voltage system.

Converter 90 is for unidirectional power conversion and will be controlled to give the required torque loading on the generator. Converter 94 converts DC link voltage to single or three-phase AC for operation of the motor and will be controlled to give the required torque loading on the motor. It will be appreciated that converters 98 and 100 are for bi-directional power conversion.

A dump resistor 104 is provided at DC link 92 across the connection with the supercapacitor 96 in order to dump or waste any excess energy should the capacitor and/or any auxiliary power storage means become fully charged. The dump resistor is selectively operable by switch 105.

Any of converters 90, 94, 98 and 100 may comprise off-the-shelf devices or else may be designed and optimised specifically for operation in the system according to the present invention.

In an alternative embodiment to FIG. 4, the auxiliary supply 102 and associated converter 100 may be connected between the converter 98 and supercapacitor 96. Furthermore it is envisaged that the system may beneficially be used in conjunction with a hybrid power vehicle such that auxiliary power may be supplied form the hybrid vehicle battery system or electric drive.

Figure 5:
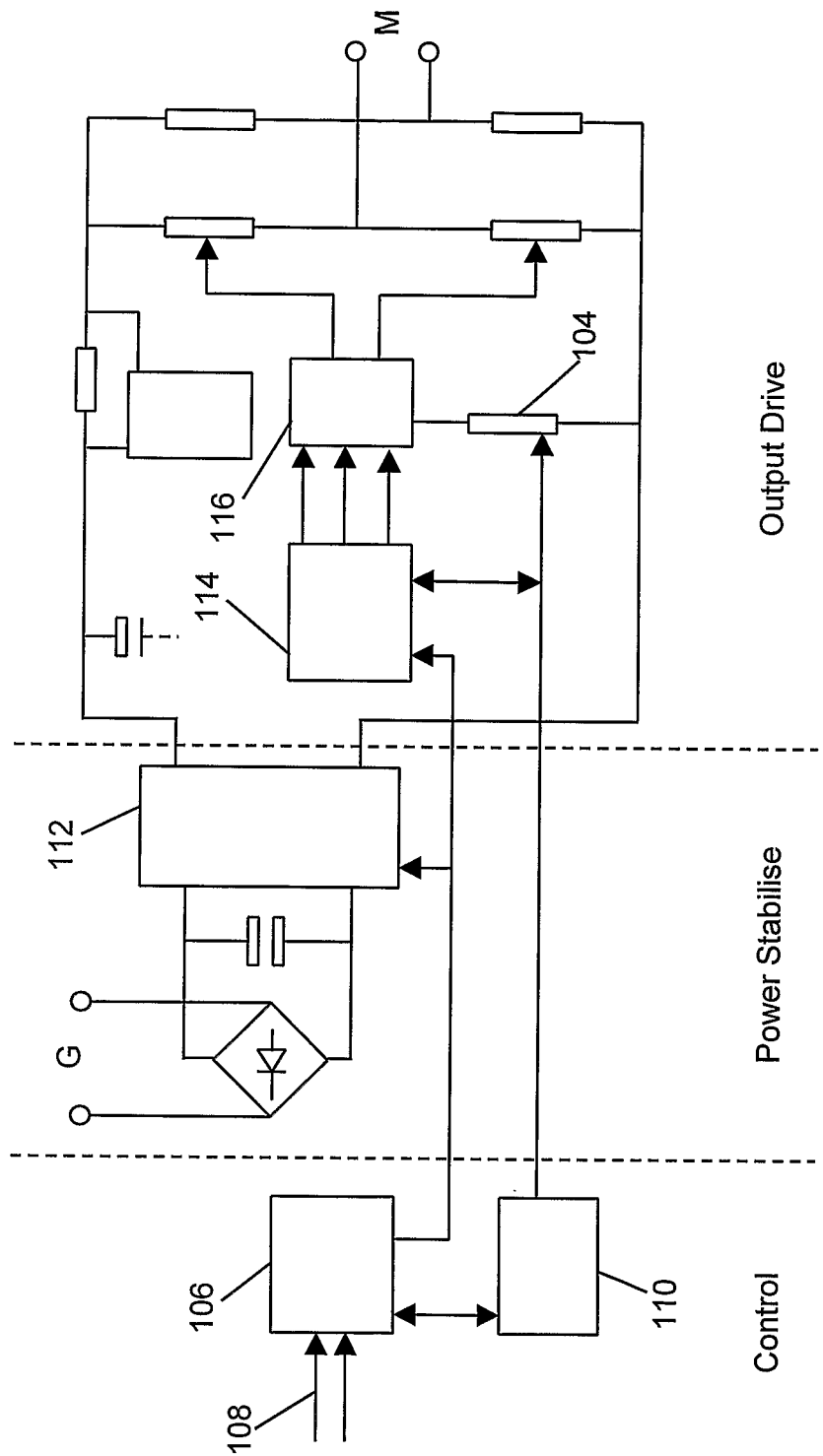
FIG. 5 shows a schematic of one embodiment of the electrical system including control means; and, FIG. 6, including 6A-6C, shows signal processing techniques for use in conjunction with the present invention.

FIG. 5 shows a schematic of how an electrical/electronic control strategy may be implemented. The operation of a number of the electrical components within the system is controlled by control CPU 106. This may be a dedicated programmable CPU provided with machine readable instructions in accordance with the control philosophy described in relation to FIG. 2 above. Alternatively, the functionality of the CPU may be integrated within the exiting engine control unit within the vehicle.

The CPU 106 receives a plurality of signals at 108 indicative of the demands being placed on the system, for example by the driver, as well as the operating conditions which are monitored by a number of sensors. It will be appreciated that a number of sensors would be located throughout the system to measure operational variables such as electrical charge, rotational speeds of turbine, compressor, motor and/or generator, temperatures and current.

The power stabilisation section comprises a switched-mode power supply (SMPS) 112 so as to provide AC/DC converter means. It will be appreciated that a sine wave signal from the generator 24 is thus converted to a digital rectangular waveform. The generator has a wide range output voltage capability and so intermediate power conversion means are provided and may comprise a stabilising battery or capacitor.

Digital signal processor 114 is used to process the digital signal under the control of the CPU 106 so generate a control signal for the drive 116. The drive outputs the signal for operation of the motor 42. As can be seen in FIG. 5, the dump resistor 104 is operable under the control of a safety CPU 110 which ensures that maximum operating conditions, such as charge, temperature and the like are not exceeded. In an alternative embodiment, the function of the safety CPU and control CPU 106 may be integrated into a single processor.

For reasons described below, the internal control synthesising frequency for the signal may be roughly a factor of ten or more times greater than the frequency of the generator. Thus if the generator and/or motor are operating at roughly 1 kHz, the internal switching to create the AC signal for the motor would be in the region of 10 kHz. The generation of a smooth sine wave signal has been found to be important for the correct operation of motor at high speeds.

In FIG. 6, one inverter topology in the form of a three-phase bridge is shown. The usual power electronic switching element will be an Insulated gate bipolar transistor (IGBT) or power metal-oxide-semiconductor field-effect transistor (MOSFET). The switching sequence of the IGBT's in each leg U-Z in FIG. 6 determines the operation of the inverter and the harmonics fed into the electrical machine windings.

The simplest switching sequence is "quasi square wave" operation when the IGBT's in each leg are switched in sequence for 120° conduction as shown in FIG. 6A. This produces a six step line voltage. In this system the IGBT's are required to switch at the line frequency but the line voltage is determined by the dc input voltage.

Some voltage control within the inverter is possible by changing the conduction period from 120° or by introducing "notches" into the switching sequence but the main mode of voltage control is to alter the DC input voltage. This can be done by incorporating a DC/DC converter at the input of the inverter with the inverter current control being carried out in this DC/DC converter. The inverter switches the current between the phases at the correct time and in the correct sequence. When driving the motor the timing of this switching is crucial and is determined by the rotor position at any point in time.

This sometimes requires the need of a shaft encoder but sensorless control schemes are also available.

An alternative switching strategy is to modulate the switching of the IGBT's in each leg to produce the waveform as shown in FIG. 6B. By controlling the number and the width of the pulses in each cycle the output voltage can be controlled from zero to its maximum value whilst controlling the harmonic content of the current waveform. Such a pulse width modulation (PWM) switching scheme may require the switching frequency to be at least 10 times the line frequency in order to achieve the control of the harmonic currents.

Currently IGBT's are readily available to operate at 20 kHz or more and are thus suitable for implementation in such a control system.

The operation of the inverter also depends on the mode of operation of the motor since the motor can be mode to operate as either a brushless DC motor or as a synchronous motor. If operated as a brushless DC motor then the machine will typically be designed to have a trapezoidal flux density and EMF profile whilst if operated as a synchronous machine the EMF profile will typically be sinusoidal.

Alternative or additional features would be apparent to the person skilled in the art as described below.

The system may be provided as part of a larger system comprising one or more further turbines and compressors so as to provide an additional pressure gradient as and when required.

Other forms of compressor having differing inlet and outlet flow characteristics may be substituted for compressor 50.

The compressor may be used for additional functions, other than merely compressing air into the engine, such as inducing airflow into the cabin and providing compression for alternative systems, such as hybrid engines or the like.

The invention claimed is:

1. A forced induction system for an internal combustion engine with a crankshaft, said system comprising:
    a compressor for increasing the pressure of gas into said internal combustion engine;
    a turbine mechanically decoupled from the compressor and arranged to be driven by engine exhaust gas;
    a generator arranged to be driven by said turbine at a first rotational speed and to generate an electrical signal output with a first frequency;
    an electric motor arranged to drive said compressor, wherein said generator and said motor are electrically coupled; and
    a control arranged to receive said electrical signal output by said generator during operation and to apply an alternating current control signal with a second rotational speed, independently of the first rotational speed of said generator whereby said compressor is driven at least in part by an output torque of the turbine via said electrical coupling, wherein the control comprises a frequency modulator arranged to control the flow of electricity between the generator and the electric motor.

2. The forced induction system according to claim 1, further comprising a second generator arranged to be driven by the engine crankshaft.

3. The forced induction system according to claim 1, wherein said control comprises an alternating current to direct current power converter.

4. The forced induction system according to claim 3, further comprising an energy storage connected between said generator and said motor.

5. The forced induction system according to claim 4, wherein said control controls the flow of electricity between each said generator, said energy storage and said motor based at least in part upon engine operation parameters.

6. The forced induction system according to claim 4, further comprising a direct current to alternating current power converter connected between said energy storage and said motor.

7. The forced induction system according to claim 4, further comprising a direct current bus connected between each said generator, said energy storage and said motor.

8. The forced induction system according to claim 4, wherein said energy storage comprises a super capacitor.

9. The forced induction system according to claim 4, further comprising an auxiliary energy storage arranged to store energy derived from the engine crankshaft.

10. The forced induction system according to claim 1, wherein said control comprises a digital signal processor.

11. The forced induction system according to claim 1, wherein any or any combination of said generator and said motor comprise a permanent magnet type machine.

12. The forced induction, system according to claim 11, wherein a magnet of said permanent magnet type machine is held against a rotor body by a retaining sleeve formation.

13. The forced induction system according to claim 1, wherein said generator is driven by said turbine via a mechanical gearing.

14. The forced induction system according to claim 1, wherein said compressor is driven by said motor via a gearing.

15. The forced induction system according to claim 1, wherein the frequency of the alternating current control signal is controlled by the controller independently of the amplitude of the alternating current control signal.

16. A forced induction system for an internal combustion engine with a crankshaft, the system comprising:
- a compressor for increasing the pressure of gas into said engine;
- a turbine mechanically decoupled from the compressor and arranged to he driven by engine exhaust gas;
- a generator arranged to be driven by said turbine;
- an electric motor arranged to drive said compressor, wherein said generator and said motor are electrically coupled;
- an energy storage coupled between said generator and said motor; and
- a control arranged to receive an electrical output signal by said generator during operation and to apply an alternating current control signal to said electric motor whereby said compressor is driven at least in part by an output torque of said turbine by said electrical coupling, wherein the control comprises a frequency modulator arranged to control the flow of electricity between the generator and the electric motor; and
- wherein said control comprises an alternating current to direct current power converter and an energy dissipating device selectively connectable between said generator and said storage when said storage is charged at or beyond a predetermined threshold.

17. The forced induction system according to claim 16, wherein said energy dissipating device comprises a resistor.

18. A forced induction system for an internal combustion engine with a crankshaft, said system comprising:
- a compressor for increasing the pressure of gas into said internal combustion engine;
- a turbine mechanically decoupled from the compressor and arranged to be driven by engine exhaust gas;
- a generator arranged to be driven by said turbine and to generate an electrical signal output;
- an electric motor arranged to drive said compressor, wherein said generator and said motor are electrically coupled; and
- a control arranged to receive said electrical signal output by said generator during operation and to apply an alternating current control signal to said electric motor whereby said compressor is driven at least in part by an output torque of the turbine via said electrical coupling, wherein the control comprises a frequency modulator arranged to control the flow of electricity between the generator and the electric motor wherein said control comprises a digital signal processor and wherein said signal processor comprises an electronic switch arranged to operate at a switching frequency which is a factor of ten or more greater than the rotational frequency of the motor.

19. A forced induction system for an internal combustion engine with a crankshaft, said system comprising:
- a compressor for increasing the pressure of gas into said internal combustion engine;
- a turbine mechanically decoupled from the compressor and arranged to be driven by engine exhaust gas;
- a generator arranged to be driven by said turbine at a first rotational speed and to generate an electrical signal output with a first frequency;
- an electric motor arranged to drive said compressor, wherein said generator and said motor are electrically coupled;
- an energy storage connected between said generator and said motor; and
- a control arranged to receive said electrical signal output by said generator during operation and to apply an alternating current control signal with a second frequency to said electric motor to drive said electrical motor at a second rotational speed, independently of the first rotational speed of said generator whereby said compressor is driven at least in part by an output torque of the turbine via said electrical coupling,
    - wherein the control comprises a frequency modulator arranged to control the flow of electricity between the generator and the electric motor,
    - wherein said control comprises an alternating current to direct current power converter, and
    - wherein a conventional engine electrical system is connected to at least one of said motor and the energy storage.

* * * * *